United States Patent [19]
Quirk et al.

[11] Patent Number: 6,107,408
[45] Date of Patent: Aug. 22, 2000

[54] PROCESSES FOR IMPROVING LINKING EFFICIENCIES IN THE SYNTHESIS OF STAR POLYMERS

[75] Inventors: Roderic Paul Quirk, Akron, Ohio; Robert James Letchford, Cherryville; James Anthony Schwindeman, Lincolnton, both of N.C.

[73] Assignee: FMC Corporation, Philadelphia, Pa.

[21] Appl. No.: 09/031,351

[22] Filed: Feb. 26, 1998

[51] Int. Cl.[7] .................................................. C08F 236/10
[52] U.S. Cl. .................... 525/272; 525/123; 525/127; 525/177; 525/98; 525/289; 525/314; 525/316; 525/332.9; 526/173; 526/180; 526/181; 526/190
[58] Field of Search .................................. 525/272, 123, 525/127, 177, 98, 289, 314, 316, 332.9; 526/173, 180, 181, 190

[56] References Cited

U.S. PATENT DOCUMENTS

| | | | |
|---|---|---|---|
| 3,280,084 | 10/1966 | Zelinski et al. | 525/271 |
| 3,377,404 | 4/1968 | Zelinski et al. | 526/173 |
| 3,639,517 | 2/1972 | Kitchen et al. | 525/314 |
| 3,985,830 | 10/1976 | Fetters et al. | 525/314 |
| 5,798,418 | 8/1998 | Quirk | 525/314 |

*Primary Examiner*—James J. Seidleck
*Assistant Examiner*—Olga Asinovsky
*Attorney, Agent, or Firm*—Alston & Bird LLP

[57] ABSTRACT

Processes for the synthesis of star or multi-branched polymers and the resultant polymers. One or more alkadiene monomers are polymerized in the presence of suitable organometallic initiators and subsequently coupled to form star polymers. Prior to coupling, one or more alkenylsubstituted aromatic hydrocarbons are incorporated at the living ends of the polydienyl anions to provide increased linking efficiencies.

27 Claims, 2 Drawing Sheets

SEC traces of base PBDLi (------) and star-branched polybutadiene (______) prepared by DVB linking of tapered PBD-b-PSLi ([BD]/[S] = 34.7) at 60°C in benzene.

$^1$H NMR spectrum of star-branched polybutadiene prepared by DVB linking of PBDLi at 60°C in benzene; PBDLi was prepared by the initiation of a mixture of butadiene and styrene ([BD]/[S] = 34.7) at 25°C in benzene.

UV spectra of the crossover reaction of PILi with styrene during the synthesis of tapered PI-b-PSLi copolymer end-capped with styrene ([I]/[S] = 7.3); all of the chain ends were capped by PSLi before the linking reaction by DVB.

Comparison of SEC traces of star-branced PI prepared by DVB linking of tapered PI-b-PSLi (____) ([I]/[S] = 7.3) and DVB linking of PILi (-----).

PROCESSES FOR IMPROVING LINKING EFFICIENCIES IN THE SYNTHESIS OF STAR POLYMERS

FIELD OF THE INVENTION

This invention relates to processes for the synthesis of star polymers, and more particularly to processes for linking living anions more efficiently to produce star polymers and star or multi-branched polymers.

BACKGROUND OF THE INVENTION

Multi-branched or star-shaped polymers were described by Zelinski in U.S. Pat. No. 3,280,084, in which polybutadiene anion (generated by addition of butyllithium to butadiene) was coupled with 0.02 to 1 part by weight of divinylbenzene to 100 parts of monomer. The resultant star polymer had a polydivinylbenzene core and several identical arms of polybutadiene radiating from the core. The arms could also be either random or block copolymers of styrene and butadiene, wherein the diene is the major component. The synthesis of star polymers with arms of different molecular weights was disclosed by Kitchen et al, U.S. Pat. No. 3,639,517. Fetters and Bi, U.S. Pat. No. 3,985,830, detailed the preparation of star polymers with a nucleus of more than one molecule of divinylbenzene, and more than three arms. These polymers were formed by addition of living homopolymers and copolymers of conjugated diene monomers and block copolymers of conjugated diene monomers and monovinylaromatic monomers to divinylbenzene. Unfunctionalized star polymers have been employed as viscosity index (V.I.) improvers for lube oil compositions (see for example, U.S. Pat. Nos. 5,310,490 and 5,310,814).

Star polymers have also been prepared which contain functionality, such as hydroxy groups, at the ends of the arms. For instance, European Patent Application 0632075 is directed to the preparation of star molecules with hydroxyl groups at the terminus of each living arm of the star. However, these functionalization reactions are often inefficient, due to the formation of physical gelation phenomena that produce severe mixing problems (see L. Weber, Makromol. Chem., Macromol. Symp., 3, 317 (1986) and U.S. Pat. Nos. 5,393,843 and 5,478,899). These polymers were prepared by addition of ethylene oxide to the living anions at the ends of the arms of the star polymer. These functionalized star polymers are stated to be useful in making adhesives, sealants, coatings, films and fibers.

While these and other techniques for the synthesis of star polymers can be useful, they can also suffer various drawbacks. For example, these and other prior techniques can exhibit poor linking efficiencies of the living polymer anions. This in turn can result in lower yields and non-uniform chemical properties of the star polymers.

SUMMARY OF THE INVENTION

The present invention provides processes for the preparation of star or multi-branched polymers which exhibit improved linking efficiencies of the living polymer anions. As a result, improved yields of the star polymers are observed. This in turn reduces waste or loss of polydiene anions, polymerization initiator, and the like. In addition, the process of the invention can provide increased control of the star polymer structure.

In the invention, conjugated alkadiene monomer(s) are anionically polymerized in a suitable solvent medium, typically at a temperature from −30° C. to 150° C. for a period of at least one hour, with a suitable initiator or mixture of initiators. The monomer(s) can be polymerized using protected functionalized initiators, alklyllithium (non-functional) initiators, or a mixture of alkyllithium initiators and protected functionalized initiators. The resultant living diene anions are then coupled using a coupling agent.

In contrast to prior techniques, however, the living diene anions are end-capped with a minor amount of one or more alkenylsubstituted aromatic hydrocarbons at the living ends thereof. The living diene anions can be end-capped, for example, by addition of small amounts of alkenylsubstituted aromatic hydrocarbon(s) prior to, during, or after diene polymerization is substantially complete. Surprisingly, the inventors have found that the addition of small amounts (from about 0.5 to about 15 mole percent) of a suitable alkenylsubstituted hydrocarbon to a living polydiene anion can afford higher coupling efficiencies.

The present invention also provides star or multi-branched polydiene polymers. In this embodiment of the invention, the star polymer includes a plurality of polydiene arms radiating outwardly from a core derived from one or more linking agents. The polydiene arms include from about 0.5 to about 15 mole percent of at least one alkenylsubstituted aromatic hydrocarbon incorporated therein, at least a portion of which is incorporated into the polydiene arms at an end thereof connected to the core. The polydiene arms can include substantially all of the alkenylsubstituted aromatic hydrocarbon incorporated therein at the end connected to the core. Alternatively, the polydiene arms can also include alkenylsubstituted aromatic hydrocarbon incorporated within the polydiene arm.

BRIEF DESCRIPTION OF THE DRAWINGS

Some of the features and advantages of the invention will become apparent from the detailed description which follows, and from the accompanying drawings, in which.

DETAILED DESCRIPTION OF THE INVENTION

Living polymer anions are prepared by anionically polymerizing at least one conjugated alkadiene monomer in an inert solvent (hydrocarbon) or mixed hydrocarbon-polar solvent medium, typically at a temperature from −30° C. to 150° C. for a period of at least one hour, with a suitable initiator or mixture of initiators. The monomer(s) include conjugated alkadienes and mixtures thereof. Exemplary conjugated alkadiene hydrocarbons include, but are not limited to, 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and mixtures thereof.

The monomer(s) can be polymerized using one or more protected functionalized initiators, i.e., singly or as combinations thereof, to provide star polymers with polymer arms having the same protecting groups, different protecting groups and/or different functional groups at the ends of the polymer arms. Alternatively, the monomers can be polymerized using one or more alkyllithium initiators to provide star polymers with arms having non-functional ends, or a mixture of one or more alkyllithium initiators with one or more protected functionalized initiators to provide star polymers with arms having a combination of functional and non-functional ends.

The resultant polydienyl anions are then coupled or linked using a suitable linking agent as described below. In contrast to prior techniques for the synthesis of star polymers, in the invention, to improve linking efficiencies of the polymer anions, a suitable alkenylsubstituted aromatic hydrocarbon or mixture thereof is introduced before, during or after polymerization, so that at least a portion of the alkenylsubstituted aromatic hydrocarbon is incorporated into the living end of the polydienyl anions prior to the coupling reaction. Stated differently, alkenylsubstituted aromatic hydrocarbon is incorporated at the living chain end, and the resultant living polymer can be described as a living polydiene end-capped with alkenylsubstituted aromatic hydrocarbon. Typically about 0.5 to about 15 mole percent alkenylsubstituted aromatic hydrocarbon is introduced into the diene polymerization reaction.

For example, alkenylsubstituted aromatic hydrocarbon(s) can be introduced after polymerization of the alkadiene monomers is essentially complete. In this embodiment, the polydienyl living polymer will have alkenylsubstituted aromatic hydrocarbon incorporated primarily at the living end. Alternatively, one or more alkenylsubstituted aromatic hydrocarbons can be introduced before or during polymerization of the polyalkadiene monomers. The resulting polydienyl living polymers will have alkenylsubstituted aromatic hydrocarbon units not only at the living ends, but also within the polydienyl chain.

The inventors have found that end capping the living end of the polydienyl anions with alkenylsubstituted aromatic hydrocarbons can provide increased linking efficiencies of the living polymer anions. This in turn can provide several advantages in the synthesis of star polymers, including increased yields, reduced loss of polydiene anions and/or initiators, and the like. This is particularly advantageous when using protected functionalized initiators, due to the current cost of such initiators.

For example, reported linking efficiencies for polydienyl living anions using divinylbenzene (DVB) as a coupling agent typically are about 81% or less. Reported linking efficiencies for polyisoprenyl living anions are somewhat higher (up to about 88–89%), but typically are less than 90%. See pages 340–343 of H. Hsieh and R. Quirk, Anionic Polymerization (Marcel Dekker, Inc. New York 1996), and the references cited therein. In contrast, in the present invention, under similar linking conditions and using similar ratios of DVB to lithium, linking efficiencies of the polydienyl living anions can be increased to at least about 90%, and higher, and for isoprenyl living anions, increased to at least about 93%, and higher.

Exemplary alkenylsubstituted aromatic hydrocarbons include, but are not limited to, styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphathalene, 1,2-diphenyl-4-methyl-1-hexene and mixtures of these, as well as alkyl, cycloalkyl, aryl, alkaryl and aralkyl derivatives thereof in which the total number of carbon atoms in the combined hydrocarbon constituents is generally not greater than 18. Examples of these latter compounds include 3-methylstyrene, 3,5-diethylstyrene, 2-ethyl-4-benzylstyrene, 4-phenylstyrene, 4-p-tolylstyrene, 2,4-divinyltoluene and 4,5-dimethyl-1-vinylnaphthalene. Reference is made to U.S. Pat. No. 3,377,404 for disclosures of additional alkenylsubstituted aromatic compounds.

Exemplary alkyllithium initiators include those represented by the formula RLi, wherein R represents an aliphatic, cycloaliphatic, or aromatic radical. Such initiators include, but are not limited to, n-butyllithium, sec-butyllithium, tert-butyllithium, 2-ethylhexyllithium, hexyllithium, and the like, and mixtures thereof.

Protected functionalized initiators useful in the invention include those having the formula:

M is an alkali metal selected from the group consisting of lithium, sodium and potassium;

Q is a saturated or unsaturated hydrocarbyl group derived by incorporation of one or more conjugated diene hydrocarbons, one or more alkenylsubstituted aromatic hydrocarbons, or mixtures thereof;

n is an integer from 0 to 5;

Z is a branched or straight chain hydrocarbon group which contains 3–25 carbon atoms, optionally containing aryl or substituted aryl groups;

T is oxygen, sulfur, or nitrogen;

$(A-R^1R^2R^3)_m$ or is a protecting group in which A is an element selected from Group IVa of the Periodic Table of the Elements; $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms; m is 1 when T is oxygen or sulfur, and 2 when T is nitrogen; and o is an integer from 0 to 7.

The above protected functionalized initiators can be prepared as described, for example, in International Publication WO 97/16465, the entire disclosure of which is incorporated by reference. In addition, the protected functionalized initiators can be prepared as described in U.S. Pat. No. 5,496,940; U.S. Pat. No. 5,600,021; U.S. Pat. No. 5,362,699; U.S. Pat. No. 5,493,044; U.S. Pat. No. 5,565,526; and U.S. Pat. No. 5,527,753. Precursors of the initiators can be prepared as described, for example, in K. Ueda, A. Hirao, and S. Nakahama, Macromolecules, 23, 939 (1990); A. Alexakis, M. Gardette, and S. Colin, Tetrahedron Letters, 29, 1988, 2951; B. Figadere, X. Franck, and A. Cave, Tetrahedron Letters, 34, 1993, 5893; J. Almena, F. Foubelo, and M. Yus, Tetrahedron, 51, 1995, 11883; D. F. Taber and Y. Wang, J. Org. Chem., 58, 1993, 6470; and F. D. Toste and I. W. J. Still, Synlett, 1995, 159.

The inert solvent employed during the polymerizations is preferably a non-polar solvent such as a hydrocarbon, since anionic polymerization in the presence of such non-polar solvents is known to produce polyenes with high 1,4-contents from 1,3-dienes. Inert hydrocarbon solvents useful in practicing this invention include, but are not limited to, inert liquid alkanes, cycloalkanes and aromatic solvents and mixtures thereof such as alkanes and cycloalkanes containing five to ten carbon atoms such as pentane, hexane, cyclohexane, methylcyclohexane, heptane, methylcycloheptane, octane, decane and and the like and mixtures thereof, and aromatic solvents containing six to ten carbon atoms such as benzene, toluene, ethylbenzene, p-xylene, m-xylene, o-xylene, n-propylbenzene, isopropylbenzene, n-butylbenzene, and the like, and mixtures thereof.

Polar solvents (modifiers) can be added to the polymerization reaction to alter the microstructure of the resulting polymer, i.e., increase the proportion of 1,2 (vinyl) microstructure or to promote functionalization or randomization. Examples of polar modifiers include, but are not limited to, diethyl ether, dibutyl ether, tetrahydrofuran, 2-methyltetrahydrofuran, methyl tert-butyl ether, 1,2-dimethoxyethane (glyme), 1,2-diethoxyethane, diazabicyclo[2.2.2]octane, triethylamine, tributylamine, N-methylpiperidine, N-methylpyrrolidine, N,N,N',N'-tetramethylethylene diamine (TMEDA), and the like and mixtures thereof. The amount of the polar modifier added depends on the vinyl content desired, the nature of the monomer, the temperature of the polymerization, and the identity of the polar modifier. The polar solvent (modifier) can be added to the reaction medium at the beginning of the polymerization as part of the solvent reaction medium or added during the polymerization.

Examples of useful linking or coupling agents include without limitation isomeric (mixtures of ortho, meta and para) dialkenylaryls and isomeric di- and trivinylaryls, such as 1,2-divinylbenzene, 1,3-divinylbenzene, 1,4-divinylbenzene, 1,2,4-trivinylbenzenes, 1,3-divinylnaphthalenes, 1,8-divinylnaphthalene, 1,2-diisopropenylbenzene, 1,3-diisopropenylbenzene, 1,4-diisopropenylbenzene, 1,3,5-trivinylnaphthalene, and other suitable materials known in the art to be useful for coupling polymers, as well as mixtures of coupling agents. See also U.S. Pat. Nos. 3,639,517 and 5,489,649, and R. P. Zelinski et al in J.Polym.Sci., A3, 93, (1965) for these and additional coupling agents. The linking process is described, for example, in U.S. Pat. No. 4,409,357 and by L. J. Fetters in Macromolecules, 9,732 (1976). Mixtures of coupling agents can also be used. Generally, the amount of coupling agent used is such that the molar ratio of protected living polymer anions to coupling agents ranges from 1:1 to 24:1.

Multi-branched or star-shaped polymers can be produced by polymerizing conjugated diene hydrocarbons as described above and subsequently reacting the resulting living polymer(s) with multifunctional linking agents. This can lead to polymer arm chain lengths of approximately the same size. Alternatively, multi-branched or star-shaped polymers can be produced by separately polymerizing monomers with initiators described above, subsequently mixing the resulting separately produced anions, and treating the resulting mixture with multifunctional linking agents. This allows for control of the molecular weight of the arms of the star polymer (for example, different polymer arm chain lengths can be produced) and provides for a more selective control of the physical properties of the resultant polymers.

If desired, when present, protecting groups can be removed from the ends of the polymer arms. This deprotection can be performed either prior to or after optional hydrogenation of the residual aliphatic unsaturation, as described in more detail below. For example, to remove tert-alkyl-protected groups, the protected polymer can be mixed with Amberlyst® 15 ion exchange resin and heated at an elevated temperature, for example 150° C., until deprotection is complete. In addition, tert-alkyl-protected groups can also be removed by reaction of the polymer with paratoluene sulfonic acid, trifluoroacetic acid, or trimethylsilyliodide. Additional methods of deprotection of the tert-alkyl protecting groups can be found in T. W. Greene and P. G. M. Wuts, Protective Groups in Organic Synthesis, Second Edition, Wiley, New York, 1991, page 41.

The tert-butyldimethylsilyl protecting groups can be removed by treatment of the polymer with acid, such as hydrochloric acid, acetic acid, paratoluene sulfonic acid, or Dowex® 50W-X8. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, New York, 1991, pages 80–83.

In addition, protecting groups can be selectively removed from the polymers, i.e., deprotecting conditions can be selected so as to remove at least one protecting group without removing other dissimilar protecting groups by proper selection of deprotecting reagents and conditions.

The following table details representative experimental conditions capable of selectively removing protecting groups (more labile) while maintaining the integrity of other different protecting groups (more stable).

| LABILE | STABLE | CONDITIONS |
| --- | --- | --- |
| t-Butyldimethylsilyl | t-Butyl | Tetrabutylammonium fluoride |
| t-Butyldimethylsilyl | t-Butyl | 1 N HCl |
| t-Butyldimethylsilyl | Dialkylamino | Tetrabutylammonium fluoride |
| t-Butyldimethylsilyl | Dialkylamino | 1 N HCl |

-continued

| LABILE | STABLE | CONDITIONS |
|---|---|---|
| t-Butyl | Dialkylamino | Amberlyst ® resin |
| t-Amyl | Dialkylamino | Amberlyst ® resin |
| Trimethylsilyl | t-Butyl | Tetrabutylammonium fluoride |
| Trimethylsilyl | t-Butyl | 1 N HCl |
| Trimethylsilyl | Dialkylamino | Tetrabutylammonium fluoride |
| Trimethylsilyl | Dialkylamino | 1 N HCl |
| 2,2,5,5-Tetramethyl-2,5-disila-1-azacyclopentane | t-Butyl | Tetrabutylammonium Fluoride |
| 2,2,5,5-Tetramethyl-2,5-disila-1-azacyclopentane | t-Butyl | 1 N HCl |
| 2,2,5,5-Tetramethyl-2,5-disila-1-azacyclopentane | Dialkylamino | Tetrabutylammonium Fluoride |
| 2,2,5,5-Tetramethyl-2,5-disila-1-azacyclopentane | Dialkylamino | 1 N HCl |

The progress of the deprotection reactions can be monitored by conventional analytical techniques, such as Thin Layer Chromatography (TLC), Nuclear Magnetic Resonance (NMR), or InfraRed (IR) spectroscopy.

Functionalized star polymers can be further reacted with monofunctional monomers, such as caprolactam, or other lactams, to form a polyamide block polymer segment, or cyclic ethers such ethylene oxide to form polyether blocks; or with difunctional monomers, such as diacids or anhydrides and diamines to form polyamide blocks, or diacids or anhydrides and diols to form polyester blocks, or diols and polyols with diisocyanates or polyisocyanates to form polyurethane blocks. Polyisocyanates or polyfunctional polyols are examples of polyfunctional monomers.

Alternatively, as noted above, functionalized star polymers can have two or more differently protected functionalized polymer arms. These star polymers can be reacted with monomer(s) as described above in the presence of a strong acid catalyst to selectively deprotect at least one of the differently protected functional groups to yield block copolymers on such arms, while maintaining the integrity of the protective group of the remaining differently protected functional group. This protective group can then be removed and the other functional end polymerized with the same monomer(s) to form polymer formed of segmented block polymers having the same polymer segments of the same or different chain lengths, or with a different monomer(s) to form polymer arms formed of segmented block polymers having different polymer segments of the same or different chain lengths.

Still another alternative is to remove the protective group of the functionalized polymer arms and to polymerize the same with monomer(s) or with a functional block polymer as described above to produce novel segmented block polymers.

The resultant novel segmented block star polymers thus can have arms including: polymer segments having the same chain length derived from the same monomer or a mix of comonomers (segmented block polymer arms); polymer segments having different chain lengths derived from the same monomer or a mix of comonomers; or polymer segments having the same or different chain lengths derived from a different monomer or a mix of comonomers (sequential segmented block polymer arms). This illustrates an advantage of the present invention, namely, the flexibility to perform different chemistries at the functional sites of the arms of the star polymers and thus to provide a wide variety of segmented block star polymers. As used herein, the term "sequential" segmented block polymers refers to star polymers having segmented block polymer arms having polymer segments of the same or different chain lengths derived from different monomers or comonomers, and/or polymer segments derived from similar monomers or comonomers but having different chain lengths.

Optionally, prior to or instead of copolymerization as described above, the functional group of the functionalized polymer arm can be converted to a different functional group. For example, an hydroxy functionality can be reacted with sulfonyl chloride in the presence of a tertiary amine catalyst to form a sulfonate functional group. The sulfonate functional group can then be reacted with a primary amine or ammonia under heat and pressure to form polymers with amine functionality at the terminus thereof. See Hinney and Baghdadchi, European Patent No. 206,714 (1986).

The polymer optionally can be hydrogenated after before or after deprotection, or before or after copolymerization, as described above. Examples of methods to hydrogenate the polymers of this invention are described in U.S. Pat. Nos. 4,970,254, 5,166,277, 5,393,843 and 5,496,898. The hydrogenation of the polymer is conducted in situ, or in a suitable solvent, such as hexane, cyclohexane or heptane. This solution is contacted with hydrogen gas in the presence of a catalyst, such as a nickel catalyst. The hydrogenation is typically performed at temperatures from 25° C. to 150° C., with a archetypal hydrogen pressure of 15 psig to 1000 psig. The progress of this hydrogenation can be monitored by InfraRed (IR) spectroscopy or Nuclear Magnetic Resonance (NMR) spectroscopy. The hydrogenation reaction is preferably conducted until at least 90% of the aliphatic unsaturation has been saturated. The hydrogenated polymer is then recovered by conventional procedures, such as removal of the catalyst with aqueous acid wash, followed by solvent removal or precipitation of the polymer.

The following are examples of the preparation of the polymers of this invention.

EXAMPLE 1

Synthesis of Star Polybutadiene by DVB Linking of Tapered

Poly(butadiene-b-stryryl)lithium (PBD-b-PSLi) Anions

Poly(butadienyl)lithium was prepared as follows. After thorough evacuation and filling with dry argon, an all-glass, high vacuum reactor was charged with a 0.15 mL of s-butyllithium (s-BuLi, 1.45 M, 0.22 mmol) under a positive argon pressure. After evacuation, 100 mL of purified benzene was distilled directly into the reactor followed by removal from the vacuum line by heat sealing with a hand torch. 9 mL of 1,3-Butadiene (6.48 g, 120 mmol) was added into the reactor via an ampoule with a breakseal, immediately followed by the addition of 0.4 mL (0.36 g, 3.46 mmol) of styrene ([BD]/[S]=34.7, 5.3 wt. %) via another ampoule with a breakseal with stirring. The polymerization proceeded at room temperature for 15 hours. During this time the reactor was cooled several times with ice to condense butadiene monomer into the solution. UV-vis spectroscopy was used to monitor the crossover reaction of poly (butadienyl)lithium (PBDLi) ($\lambda$max=290 nm) to poly (butadiene-b-stryryl)lithium (PBD-b-PSLi) ($\lambda$max=334 nm).

A 2 mL aliquot of PBDLi was separated for use as base polymer prior to the addition of DVB. Analysis of the aliquot by SEC (FIG. 1) showed a molecular weight of $M_n=4.3\times10^4$ g/mol (calc. $M_n=4.0\times10^4$ g/mol) and a narrow molecular weight distribution ($M_{10}/M_n=1.04$).

0.11 mL (0.1 g, 0.42 mmol) of DVB (Aldrich, 55% tech. grade, [DVB]/[PBD-b-PSLi]=3.0) was ampoulized and connected to the reactor via a side arm. This side arm was then evacuated. The PBD-b-PSLi solution was heated to 60° C. and the DVB was added into the reactor with stirring. The linking reaction proceeded for 9 hours at 60° C. and then was terminated with degassed methanol. After precipitation into methanol twice, the star-branched PBD-b-PS was analyzed by SEC (FIG. 1) and $^1$H NMR (FIG. 2). SEC results are also set forth in Table 1 below.

TABLE 1

| Sample | $M_n$ (arm) × $10^{-4}$ g/mol ($M_w/M_n$)[b] | $M_n$ × $10^{-5}$ g/mol[c] | Yield of Star (wt. %)[d] |
|---|---|---|---|
| PBD-DVB[a] | 3.3 | 3.1 | 81 |
| PBD-b-PS-DVB | 4.3 (1.04) | 4.9 | 93 |

Notes:
[a]A star PBD synthesized under the same conditions as those for the synthesis of PBD-b-PS-DVB without the use of styrene.
[b]Determined by SEC calibrated with standard polybutadienes.
[c]Molecular weight of the star-branched PBD determined by SEC using the universal calibration method.
[d]Determined by the ratio of the star peak area to the total peak area in SEC traces; including 8% dimer.

Figure 1:
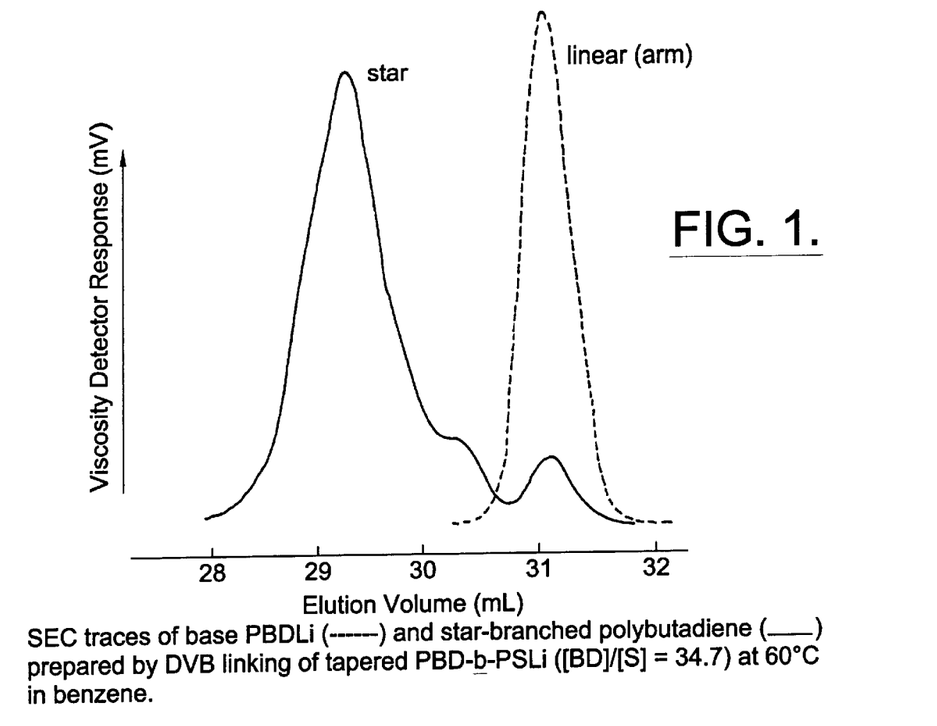
FIG. 1 is a graph illustrating SEC traces of base poly(butadienyl)lithium (PBDLi) and star-branched polybutadiene prepared by divinyl benzene (DVB) linking of tapered poly(butadiene-b-styryl) lithium (PBD-b-PSLi) ([BD]/[S]= 34.7) at 60° C. in benzene.
Figure 2:
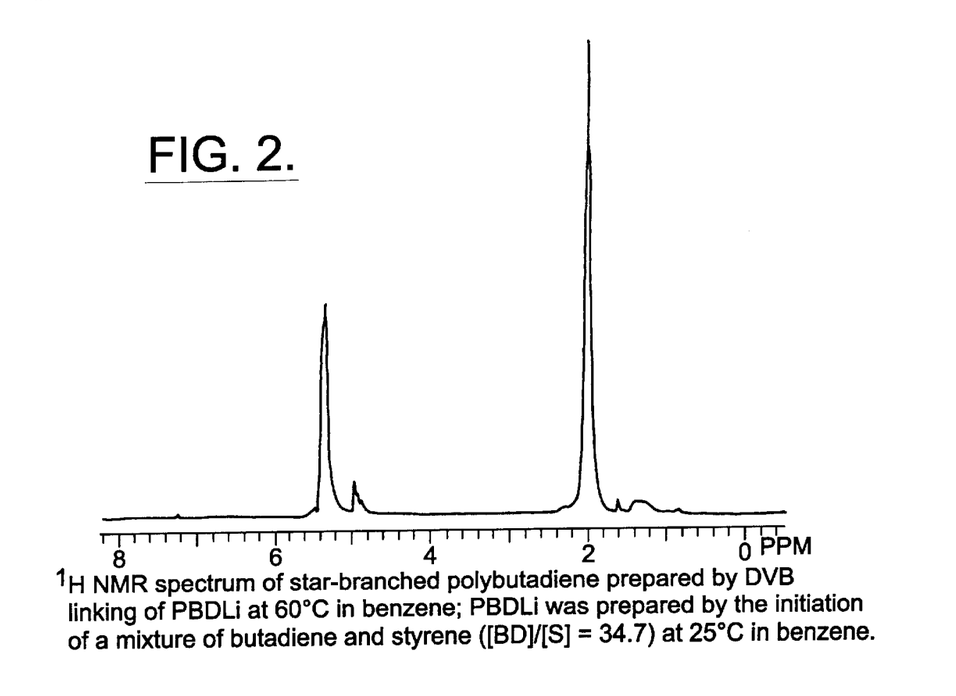
FIG. 2 is a graph illustrating $^1$H NMR spectrum of star-branched polybutadiene prepared by DVB linking of PBDLi at 60° C. in benzene, in which PBDLi was prepared by the initiation of a mixture of butadiene and styrene ([BD]/[S]=34.7) at 25° C. in benzene.

SEC analysis indicates that some dimer ($M_n$=9.4×$10^4$ g/mol) is formed in addition to star (4.9×$10^5$ g/mol) and linear (4.3×$10^4$ g/mol) polymers (FIG. 1). Only 7% linear polymer was left in the final product.

EXAMPLE 2

Synthesis of Star Polyisoprene by DVB Linking of Tapered

Poly(isoprene-b-styryl)lithium Anions (PI-b-PSLi)

Figure 3:
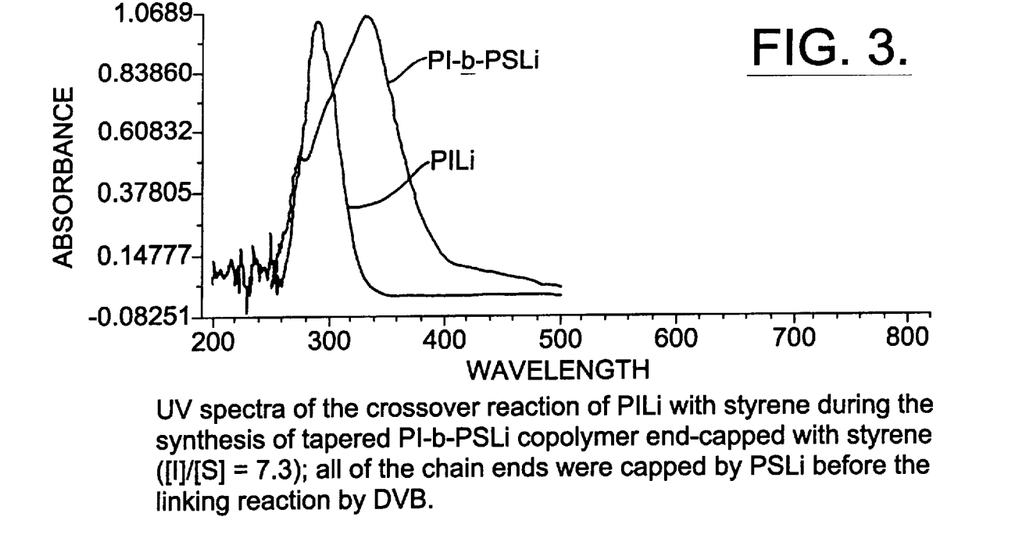
FIG. 3 is a graph illustrating UV spectra of the crossover reaction of poly(isoprenyl)lithium (PILi) with styrene during the synthesis of tapered poly(isoprene-b-styryl)lithium (PI-b-PSLi) copolymer end-capped with styrene ([I]/[S]= 7.3) and demonstrating that all of the chain ends were capped by PSLi before the linking reaction by DVB.

Tapered poly(isoprene-b-styryl)lithium (PI-b-PSLi) was prepared in cyclohexane at room temperature using s-BuLi as initiator. After thorough evacuation and filling with dry argon, an all-glass, high vacuum reactor was charged with a 0.52 mL (0.75 mmol) of s-BuLi (1.45 M) under a positive argon pressure. After evacuation, a 250 mL of purified cyclohexane was distilled directly into the reactor followed by removal from the vacuum line by heat sealing with a hand torch. 44 mL of isoprene (30 g, 441 mmol) was added into the reactor via an ampoule with a breakseal followed by the addition of a 7.0 mL (6.36 g, 61 mmol) of styrene ([isoprene]/[S]=7.3) via another ampoule with a breakseal immediately after the addition of isoprene with stirring. The polymerization proceeded at room temperature for 6 hours after which the system was intermittently degassed several times during 5 hours to remove any isoprene monomer left above the polymer solution. The temperature was raised to 50° C. to promote the crossover reaction from PILi (λmax=290 nm) to PI-b-PSLi (λmax=333 nm) which was monitored by UV-vis spectroscopy (FIG. 3). A color change from pale yellow to red was observed. After 30 minutes at 50° C., a 2 mL aliquot of PI-b-PSLi was separated and terminated with methanol via an ampoule attached to the reactor. This sample served as base polymer. Characterization of the base PI-b-PSLi by SEC provided the molecular weight ($M_n$=5.3× $10^4$ g/mole) and molecular weight distribution ($M_w/M_n$= 1.05).

0.55 mL of DVB (0.50 g, 7.69 mmol DVB ([DVB]/[PI-b-PSLi]=3.0) was ampoulized and connected to the reactor via a side arm. This side arm was then evacuated. The DVB was added into the PI-b-PSLi solution with stirring at 60° C. After the linking reaction proceeded at 60° C. for 9 hours, the reaction was terminated by addition of excess degassed methanol. The resulting polymer was precipitated into methanol two times and dried in a vacuum oven. The polymer was analyzed by SEC (FIG. 4) and $^1$H NMR.

Figure 4:
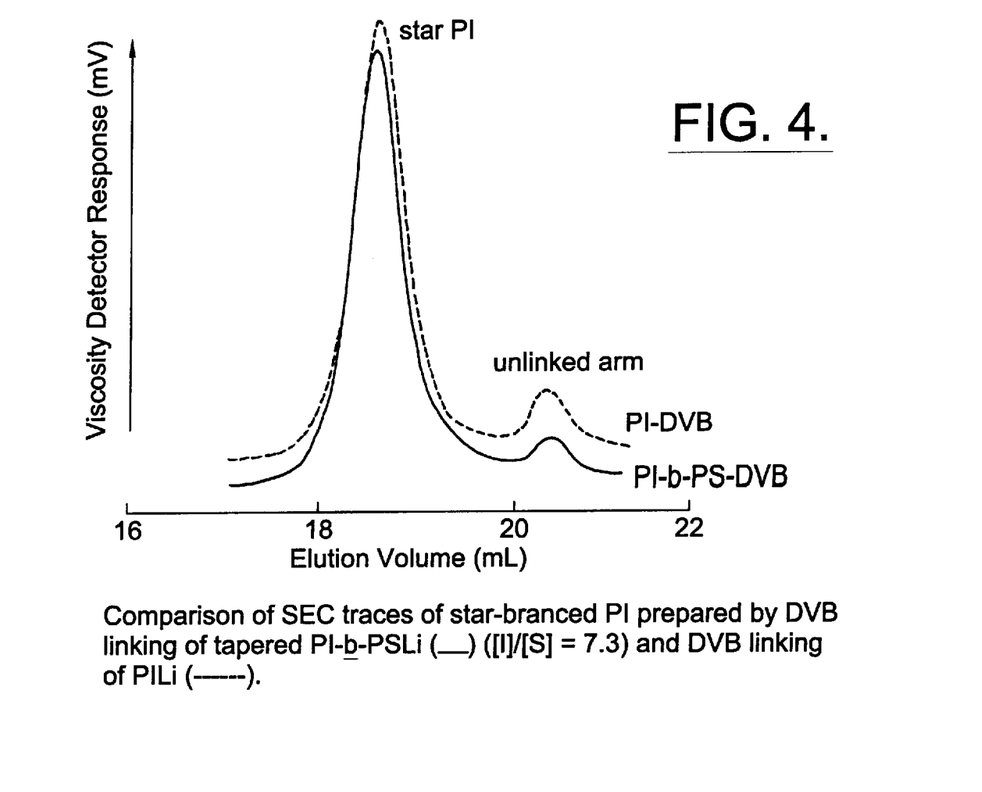
FIG. 4 is a graph comparing SEC traces of star-branched PI prepared by DVB linking of tapered PI-b-PSLi ([I]/[S]= 7.3) and DVB linking of PILi.

Compared with the DVB linking reaction of PILi (not tapered), the DVB linking reaction of tapered PI-b-PSLi exhibited a higher linking efficiency as indicated by the SEC results (FIG. 4 and Table 2, below). Considering the effect of arm molecular weight on the linking efficiency, i.e., higher arm molecular weight generally results in lower linking efficiency, the linking efficiency of PI-b-PSLi ($M_n$= 5.3×$10^4$ g/mol) might have been even higher if its molecular weight were lower.

TABLE 2

| Sample | $M_n$ (arm) × $10^{-4}$ g/mol ($M_w/M_n$)[b] | $M_n$ × $10^{-5}$ g/mol ($M_w/M_n$)[c] | Yield of Star (wt. %) ($M_w/M_n$)[d] |
|---|---|---|---|
| PI-DVB[a] | 4.4 (1.06) | 4.3 (1.15) | 88 (1.14) |
| PI-b-PS-DVB | 5.3 (1.05) | 5.5 (1.16) | 93 (1.16) |

Notes:
[a]A star PI synthesized under the same conditions as those for the synthesis of PI-b-PS-DVB without the use of styrene.
[b]Determined by SEC calibrated by standard polyisoprenes.
[c]Molecular weight of the star-branched PBD determined by SEC using universal calibration method.
[d]Determined by the ratio of the star peak area to the total peak area in SEC traces.

EXAMPLE 3

Synthesis of t-Butoxy Functionalized Polybutadiene Star by DVB Linking of Tapered Poly(isoprene-b-stryryl)lithium (PI-b-PSLi) Anions A 250 mL glass reactor is equipped with four break-seal reagent ampoules, a sampling port attached with a Teflon® stopcock, an inlet tube fitted with a septum cap, and a magnetic stir bar. This reactor is flame sealed to a high vacuum line, and evacuated at 120° C. for 8 hours. The flask is refilled with dry argon, and allowed to cool to room temperature. 3-(1,1-Dimethylethoxy)-1-propyllithium (chain extended with two equivalents of isoprene) 15.8 wt. % in toluene, 0.176 grams (0.681 mmoles) is added to the reactor with a syringe via the inlet tube. The solvent is removed and the inlet tube is then flame sealed. Benzene, 200 mL, is then vacuum distilled directly into the reactor and is melted. The flask is then removed from the vacuum line by a flame seal. Styrene monomer, 1.02 grams (9.79 mmole) and isoprene monomer, 16.00 grams (234.8 mmole), are added from break seal ampoules ([isoprene]/[styrene]=24. After addition of the monomers, the reaction solution is frozen at −78° C., and the ampoules which previously contained the monomers are heat-sealed from the reactor in order to reduce headspace within the system. The reaction mixture is then placed in a constant temperature bath at 50° C. for eight hours to complete the polymerization. The polymerization reaction is monitored by UV/Vis spectra for disappearance of the polyisoprenyl absorbance at 292 nm. When the polymerization is complete, a 2 mL aliquot is withdrawn through the sample port, and quenched with methanol. The resultant base polymer is analyzed by SEC.

The reactor is intermittently degassed several times during five hours to remove any residual isoprene. The star polymer is then formed by the addition of 0.48 grams of 55% divinylbenzene (2.04 mmoles) ([DVB]/[PI-b-PSLi]=3.0 from a break seal ampoule. The reaction mixture is stirred at 60° C. for nine hours, then is quenched with degassed methanol (2.0 mL) added from the last break seal ampoule. The polymer is recovered by precipitation two times into methanol, and vacuum dried.

The resultant functionalized base polymer is characterized by SEC, and has the following properties:

$M_n$=2.52×10$^4$ g/mole
$M_w$=2.63×10$^4$ g/mole
$M_w/M_n$=1.04

The resultant functionalized star polymer is fully characterized by $^1$H NMR and SEC, and has the following properties:

$M_n$=2.02×10$^5$ g/mole.
$M_w$=2.24×10$^5$ g/mole
$M_w/M_n$=1.11
Yield=94%
% Unlinked=6%

The $^1$H NMR spectrum exhibits a peak at 1.17 ppm for the t-butoxy group.

EXAMPLE 4

Synthesis of t-Butyldimethylsilyloxy Functionalized Polybutadiene Star by DVB Linking of Poly(butadiene-b-styryl)lithium (PBD-b-PSLi) Anions A 500 mL glass reactor is equipped with four break-seal reagent ampoules, a sampling port attached with a Teflon® stopcock, an inlet tube fitted a septum cap, and a magnetic stir bar. This reactor is flame sealed to a high vacuum line, and evacuated at 120° C. for 8 hours. The flask is refilled with dry argon, and allowed to cool to room temperature. 3-(t-Butyldimethylsilyloxy)-1-propyllithium 16.52 wt. % in cyclohexane, 1.32 grams (7.33 mmoles) is added to the reactor with a syringe via the inlet tube. The inlet tube is then flame sealed, and the reactor is re-evacuated. Dry cyclohexane solvent, 292.00 grams (374.84 mL), and N,N,N',N'-tetramethylethylenediamine, 1.70 grams (14.66 mmoles, 2.00 equivalents) are then distilled directly into the reactor. The flask is then removed from the vacuum line by a flame seal. The reactor is then heated to 30° C., and 29.20 grams (540 mmole) of butadiene is added from a break seal ampoule. The reaction mixture is held at 30° C. for twenty-four hours to complete the polymerization. The reactor is intermittently degassed several times during five hours to remove any residual butadiene.

Styrene, 1.87 grams (18 mmole) is then added from a break seal ampoule ([butadiene]/[styrene])=30. The reaction mixture is then placed in a constant temperature bath at 50° C. for eight hours to complete the polymerization. The polymerization reaction is monitored by UV/Vis spectra for disappearance of the polybutadienyl absorbance at 290 nm. A 2 mL aliquot is withdrawn through the sample port, and quenched with methanol. The resultant base polymer is analyzed by SEC.

The star polymer is then formed by the addition 4.83 grams of 55% divinylbenzene (20.4 mmole) ([DVB]/[PBD-b-PSLi])=3.0 from a break seal ampoule. The reaction mixture is stirred at 60° C. for nine hours, then quenched with degassed methanol (2.0 mL) added from the last break seal ampoule. The polymer is recovered by precipitation two times into methanol, and vacuum dried.

The resultant functionalized base polymer is characterized by SEC, and has the following properties:

$M_n$=4570 g/mole
$M_w$=4940 g/mole
$M_w/M_n$=1.08

The resultant functionalized star polymer is fully characterized by $^1$H NMR and SEC, and has the following properties:

$M_n$=35400 g/mole
$M_w$=42500.
$M_w/M_n$=1.20
Yield=95%
% Unlinked=5

The $^1$H NMR spectrum indicated a 1.4:1.2 ratio of 6:4, and exhibited a peak at 0.88 ppm assigned to the t-butyldimethylsilyloxy group.

EXAMPLE 5

Synthesis of t-Butoxy Functionalized Polyethylene Polybutylene Star by DVB Linking of Tapered Poly(1,4-butadiene-b-1,2-butadiene-b-stryryl)lithium (1,4-PBD-1,2-PBD-b-PSLi) Anions A 250 mL glass reactor is equipped with five break-seal reagent ampoules, a sampling port attached with a Teflon® stopcock, an inlet tube fitted with a septum cap, and a magnetic stir bar. This reactor is flame sealed to a high vacuum line, and evacuated at 120° C. for 8 hours. The flask is refilled with dry argon, and allowed to cool to room temperature. 3-(1,1-Dimethylethoxy)-1-propyllithium (chain extended with two equivalents of isoprene) 15.8 wt. % in toluene, 0.176 grams (0.681 mmoles) is added to the reactor with a syringe via the inlet tube. The solvent is removed and the inlet tube is then flame sealed. Dry cyclohexane, 200 mL, is then vacuum distilled directly into the reactor and is melted. The flask is then removed from the vacuum line by a flame seal. The reaction mixture is then placed in a constant temperature bath at 30° C., and 6.81 grams (126 mmole) of 1,3-butadiene is added from a break seal ampoule. The reaction mixture is held at 30° C. for twenty four hours to complete the polymerization. N,N,N', N'-Tetramethylethylenediamine, 0.16 grams (1.36 mmole, 2.00 equivalents) is then added with a syringe. An additional 6.81 grams (126 mmole) of 1,3-polybutadiene is added from a break seal ampoule. The reaction mixture is held at 30° C. for forty hours to complete the polymerization. The reactor is intermittently degassed several times during five hours to remove any residual butadiene.

Styrene, 0.87 grams (8.39 mmole) is then added from a break seal ampoule ([butadiene]/[styrene])=30. The reaction mixture is then placed in a constant temperature bath at 50° C. for eight hours to complete the polymerization. The polymerization reaction is monitored by UV/Vis spectra for disappearance of the polybutadienyl absorbance at 290 nm. A 2 mL aliquot is withdrawn through the sample port, and quenched with methanol. The resultant base polymer is analyzed by SEC.

The star polymer is then formed by the addition of 0.44 grams of 55% divinylbenzene (1.88 mmoles) ([DVB]/[PBD-b-PBD-b-PSLi]=3.0 from a break seal ampoule. The reaction mixture is stirred at 60° C. for nine hours, then is quenched with degassed methanol (2.0 mL) added from the last break seal ampoule. The polymer is recovered by precipitation two times into methanol, and vacuum dried.

The resultant functionalized base polymer is characterized by SEC, and has the following properties:

$M_n$=2.31×10$^4$ g/mole
$M_w$=2.45×10$^4$ g/mole
$M_w/M_n$=1.06

The resultant functionalized star polymer is fully characterized by $^1$H NMR and SEC, and has the following properties:

$M_n=2.22\times10^5$ g/mole.

$M_w=2.51\times10^5$ g/mole $M_w/M_n=1.13$

Yield=94%

% Unlinked=6%

The $^1$H NMR spectrum exhibits a peak at 1.17 ppm for the t-butoxy group.

The polymer prepared above, cyclohexane, and a Falk catalyst is charged to a reactor suitable for hydrogenation. The hydrogenation reaction is followed by disappearance of the olefinic signals in the NMR. When the reaction is complete, the polymer is recovered by conventional techniques.

The foregoing examples are illustrative of the present invention and are not to be construed as limiting thereof.

That which is claimed is:

1. A process for preparing multi-branched or star polyalkadiene polymers exhibiting increased linking efficiency, the process comprising:

polymerizing at least one conjugated alkadiene monomer with at least one organometallic initiator in the presence of about 0.5 to about 15 mole percent of at least one alkenylsubstituted aromatic hydrocarbon to form living polydiene anions end capped with alkenylsubstituted aromatic hydrocarbon;

coupling said end capped living polydiene anions with at least one linking agent which is not the same as said alkenylsubstituted aromatic hydrocarbon to provide a multi-branched or star-shaped polydiene polymer at a higher coupling efficiency as compared to coupling efficiencies exhibited by coupling living polyalkadiene anions which are not end capped with alkenylsubstituted aromatic hydrocarbon under the same conditions; and optionally hydrogenating said multi-branched or star-shaped polydiene polymer.

2. The process of claim 1, wherein said alkenylsubstituted aromatic hydrocarbon is added to said conjugated alkadiene monomer before said polymerizing step.

3. The process of claim 1, wherein said alkenylsubstituted aromatic hydrocarbon is added to said conjugated alkadiene monomer during said polymerizing step.

4. The process of claim 1, wherein said alkenylsubstituted aromatic hydrocarbon is added after said polymerizing step and before said coupling step.

5. The process of claim 1, wherein said conjugated alkadiene monomer comprises a compound selected from the group consisting of 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3 -hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and mixtures thereof.

6. The process of claim 5, wherein said conjugated alkadiene monomer comprises a compound selected from the group consisting of 1,3-butadiene, isoprene, and mixtures thereof.

7. The process of claim 1, wherein said alkenylsubstituted aromatic hydrocarbon comprises a compound selected from the group consisting of styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphathalene, 1,2-diphenyl-4-methyl-1-hexene and alkyl, cycloalkyl, aryl, alkaryl and aralkyl derivatives thereof in which the total number of carbon atoms in the combined hydrocarbon constituents is generally not greater than 18, and mixtures thereof.

8. The process of claim 7, wherein said alkenylsubstituted aromatic hydrocarbon comprises styrene.

9. The process of claim 1, wherein said organometallic initiator comprises at least one protected functional initiator.

10. The process of claim 9, wherein said protected functional initiator comprises a compound of the formula or wherein:

M is an alkali metal selected from the group consisting of lithium, sodium and potassium;

Q is a saturated or unsaturated hydrocarbyl group derived by incorporation of one or more conjugated diene hydrocarbons, one or more alkenylsubstituted aromatic hydrocarbons, or mixtures thereof;

n is an integer from 0 to 5;

Z is a branched or straight chain hydrocarbon group which contains 3–25 carbon atoms, optionally containing aryl or substituted aryl groups;

T is oxygen, sulfur, or nitrogen;

$(A-R^1R^2R^3)_m$ or is a protecting group in which A is an element selected from Group IVa of the Periodic Table of the Elements; $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms; m is 1 when T is oxygen or sulfur, and 2 when T is nitrogen; and o is an integer from 0 to 7; and wherein said process further comprises optionally removing said protecting group.

11. The process of claim 10, wherein A is carbon or silicon.

12. The process of claim 1, wherein said organometallic initiator comprises at least one alkyllithium initiator represented by the formula RLi, wherein R represents an aliphatic, cycloaliphatic, or aromatic radical.

13. The process of claim 12, wherein said alkyllithium initiator comprises a compound selected from the group consisting of n-butyllithium, sec-butyllithium, tert-butyllithium, 2-ethylhexyllithium, hexyllithium, and mixtures thereof.

14. The process of claim 1, wherein said linking agent comprises a compound selected from the group consisting of isomeric dialkenylaryls, isomeric di- and trivinylaryls, and mixtures thereof.

15. A multi-branched or star diene polymer, comprising a plurality of polydiene arms radiating outwardly from a core derived from one or more linking agents, said polydiene arms comprising from about 0.5 to about 15 mole percent of at least one alkenylsubstituted aromatic hydrocarbon, which is not the same as said linking agent, incorporated therein, wherein said polydiene arms have an end connected to said core and an end distal from said core, and wherein at least a portion of said alkenylsubstituted aromatic hydrocarbon is incorporated into said polydiene arms at the end connected to said core.

16. The polymer of claim 15, wherein at least one of said polydiene arms further includes alkenylsubstituted aromatic hydrocarbon incorporated within the polydiene arm.

17. The polymer of claim 15, wherein at least one of said polydiene arms includes substantially all of said alkenylsubstituted aromatic hydrocarbon incorporated at the end connected to said core.

18. The polymer of claim 15, wherein said polydiene arms comprise one or more conjugated alkadiene monomers selected from the group consisting of 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and mixtures thereof.

19. The polymer of claim 18, wherein said conjugated alkadiene monomer is selected from the group consisting of 1,3-butadiene, isoprene, and mixtures thereof.

20. The polymer of claim 15, wherein said alkenylsubstituted aromatic hydrocarbon comprises a compound selected from the group consisting of styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphathalene, 1,2-diphenyl-4-methyl-1-hexene and alkyl, cycloalkyl, aryl, alkaryl and aralkyl derivatives thereof in which the total number of carbon atoms in the combined hydrocarbon constituents is generally not greater than 18, and mixtures thereof.

21. The polymer of claim 20, wherein said alkenylsubstituted aromatic hydrocarbon comprises styrene.

22. The polymer of claim 15, wherein at least one of said polydiene arms further includes a functional group incorporated at the end distal from said core.

23. The polymer of claim 22, wherein said functional group is incorporated at the end distal from said core via a protected functional initiator of the formula or wherein:

M is an alkali metal selected from the group consisting of lithium, sodium and potassium;

Q is a saturated or unsaturated hydrocarbyl group derived by incorporation of one or more conjugated diene hydrocarbons, one or more alkenylsubstituted aromatic hydrocarbons, or mixtures thereof;

n is an integer from 0 to 5;

Z is a branched or straight chain hydrocarbon group which contains 3–25 carbon atoms, optionally containing aryl or substituted aryl groups;

T is oxygen, sulfur, or nitrogen;

$(A{-}R^1R^2R^1)_m$ or is a protecting group in which A is an element selected from Group IVa of the Periodic Table of the Elements; $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms; m is 1 when T is oxygen or sulfur, and 2 when T is nitrogen; and o is an integer from 0 to 7; and wherein said protecting group is optionally removed.

24. The polymer of claim 23, wherein A is carbon or silicon.

25. The polymer of claim 15, wherein said core is derived by incorporation of divinylbenzene as the linking agent.

26. The polymer of claim 15, wherein said polymer is optionally hydrogenated.

27. A multi-branched or star polyalkadiene polymer prepared according to the process of:

polymerizing at least one conjugated alkadiene monomer with at least one organometallic initiator in the presence of about 0.5 to about 15 mole percent of at least one alkenylsubstituted aromatic hydrocarbon to form living polydienyl anions end capped with alkenylsubstituted aromatic hydrocarbon;

coupling said end capped living polydiene anions with at least one linking agent which is not the same as said alkenylsubstituted aromatic hydrocarbon to provide a multi-branched or star-shaped polydiene polymer at a higher coupling efficiency as compared to coupling efficiencies exhibited by coupling living polyalkadiene anions which are not end capped with alkenylsubstituted aromatic hydrocarbon under the same conditions; and optionally hydrogenating said multi-branched or star-shaped polydiene polymer.

* * * * *